US012596529B2

(12) United States Patent
Lazer et al.

(10) Patent No.: US 12,596,529 B2
(45) Date of Patent: Apr. 7, 2026

(54) CORDIC COMPUTATION OF SIN/COS USING COMBINED APPROACH IN ASSOCIATIVE MEMORY

(71) Applicant: GSI Technology Inc., Sunnyvale, CA (US)

(72) Inventors: Moshe Lazer, Binyamina (IL); Samuel Lifsches, Tel Aviv (IL); Almog Levy, Herzliya (IL)

(73) Assignee: GSI Technology Inc., Sunnyvale, CA (US)

( * ) Notice: Subject to any disclaimer, the term of this patent is extended or adjusted under 35 U.S.C. 154(b) by 920 days.

(21) Appl. No.: 17/741,481

(22) Filed: May 11, 2022

(65) Prior Publication Data

US 2022/0413799 A1    Dec. 29, 2022

Related U.S. Application Data

(60) Provisional application No. 63/213,780, filed on Jun. 23, 2021.

(51) Int. Cl.
G06F 7/48 (2006.01)
G06F 7/544 (2006.01)

(52) U.S. Cl.
CPC .......... G06F 7/5446 (2013.01); G06F 7/4818 (2013.01); *G06F 2207/4804* (2013.01)

(58) Field of Classification Search
CPC ...... G06F 7/4818; G06F 7/544; G06F 7/5446; G06F 7/5448; G06F 1/02; G06F 1/03; G06F 1/0321; G06F 1/0342; G06F 2207/4808
See application file for complete search history.

(56) References Cited

U.S. PATENT DOCUMENTS

| | | | |
|---|---|---|---|
| 9,558,812 B2 | 1/2017 | Akerib | |
| 10,832,746 B2 | 11/2020 | Akerib et al. | |
| 2019/0310827 A1* | 10/2019 | Gagliano | G06F 17/14 |

OTHER PUBLICATIONS

Fujiki et al., "In-Memory Data Parallel Processor", In Proceedings of 2018 Architectural Support for Programming Languages and Operating Systems (ASPLOS'18). ACM, New York, NY, USA, 14 pages. https://doi.org/10.1145/3173162.3173171 (Year: 2018).*
Fujiki et al., "Duality Cache for Data Parallel Acceleration", n ISCA '19: The 46th International Symposium on Computer Architecture, Jun. 22-26, 2019, Phoenix, AZ. ACM, New York, NY, USA, 14 pages. htps://doi.org/10.1145/3307650.3322257 (Year: 2019).*

* cited by examiner

*Primary Examiner* — Carlo Waje
(74) *Attorney, Agent, or Firm* — Heidi Brun Associates Ltd.; Heidi Brun

(57) ABSTRACT

A method for an associative memory device includes the steps of providing a look up table (LUT) with all possible solutions for N first iterations of a CORDIC algorithm, receiving a plurality of input angles, concurrently computing a location index for each angle of the plurality of angles and concurrently storing each index in a column of the associative memory device, copying a solution from the LUT in the location index to a plurality of columns associated with the index and concurrently performing M additional iterations of the CORDIC algorithm on the columns to compute a value of a trigonometric function for each angle.

6 Claims, 8 Drawing Sheets

300

List of angles $\alpha_k$ For Multiple calculations — 320

First part – CORDIC LUT for the first N iterations — 340

Concurrently for all angles $\alpha_k$ Compute index to LUT and get x($\alpha_k$) and y($\alpha_k$)

Second part – CORDIC computation for the next iterations — 360

Concurrently for all angles $\alpha_k$ Compute CORDIC for x($\alpha_k$) and y($\alpha_k$) iteratively from iteration N to iteration T List of sine values and list of cosine values of the input list of angles $\alpha_k$ — 380

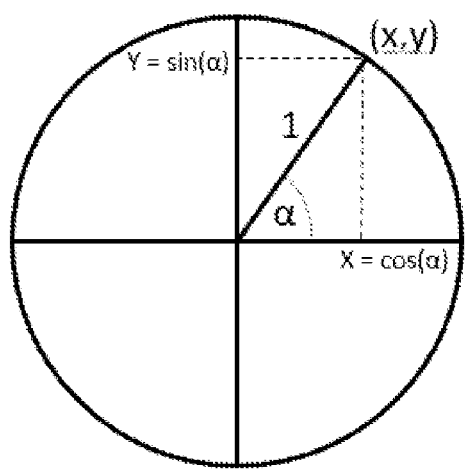
Fig. 1A – PRIOR ART
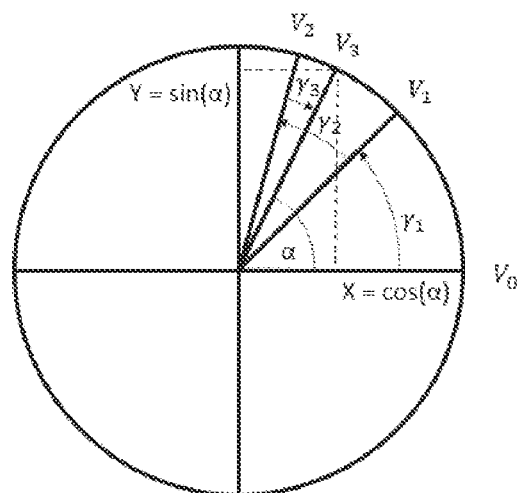
Fig. 1B - PRIOR ART

400

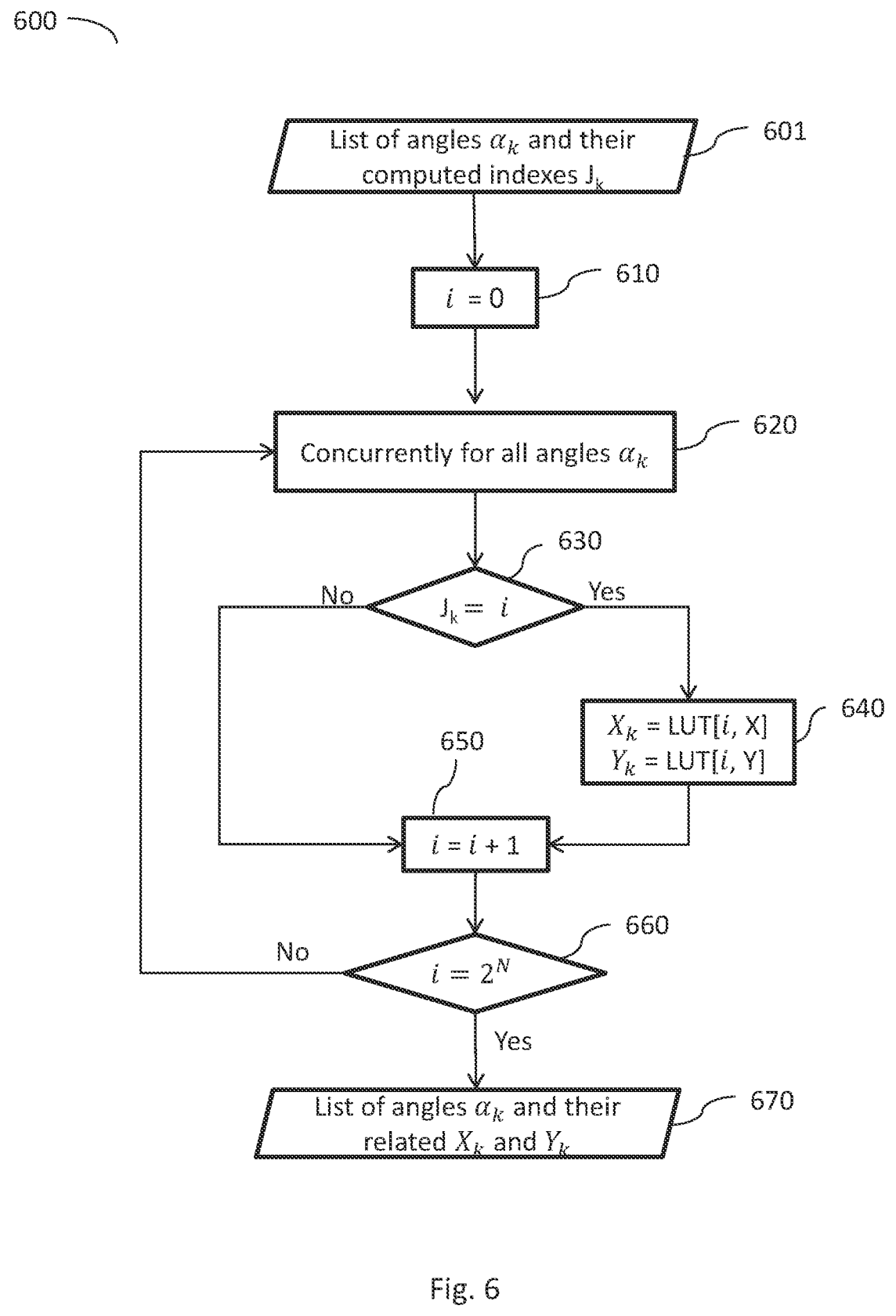

600 —

List of angles $\alpha_k$ and their computed indexes $J_k$    601

$i = 0$    610

Concurrently for all angles $\alpha_k$    620

630

No    $J_k = i$    Yes $X_k = \text{LUT}[i, X]$
$Y_k = \text{LUT}[i, Y]$    640

650

$i = i + 1$

660

No    $i = 2^N$    Yes

List of angles $\alpha_k$ and their related $X_k$ and $Y_k$    670

Fig. 6

CORDIC COMPUTATION OF SIN/COS USING COMBINED APPROACH IN ASSOCIATIVE MEMORY

CROSS REFERENCE TO RELATED APPLICATIONS

This application claims priority from U.S. provisional patent application 63/213,780, filed Jun. 23, 2021, which is incorporated herein by reference.

FIELD OF THE INVENTION

The present invention relates to computing trigonometrical functions generally and to using the CORDIC algorithm in an associative memory device in particular.

BACKGROUND OF THE INVENTION

The COordinate Rotation DIgital Computer (CORDIC) algorithm is an algorithm for computing trigonometric functions like sine and cosine. It is used as an approximation function on all popular graphic calculators.

The CORDIC algorithm revolves around the idea of "rotating" the phase of a complex number, by multiplying it by a succession of constant values. The multiplication can be by powers of 2 which can be implemented in hardware using shifts and adds.

FIG. 1A, to which reference is now made, is an illustration of a point (x, y) in the unit circle (a circle with a radius equals to 1). Point (x, y) can be expressed as two trigonometric functions of the angle $\alpha$: $x=\cos(\alpha)$ and $y=\sin(\alpha)$.

The CORDIC algorithm performs successive iterations of rotations clockwise and/or counterclockwise by decreasing angles $\gamma_i$. The iteration may start at angle $\theta$ where each step in the algorithm performs a rotation towards angle $\alpha$. Alternatively, the iteration may start at angle $\alpha$ where each step in the algorithm performs a rotation towards angle $\theta$.

FIG. 1B, to which reference is now made, is an illustration of the CORDIC algorithm used iteratively to determine the value of sine or cosine of an angle $\alpha$, starting at angle $\theta$. In the first iteration, the first rotating angle ($\gamma_1$) may rotate counterclockwise reaching point v1 in the unit circle. Angle $\alpha$ in the example is larger than $\gamma_1$; therefore, in the next iteration, rotating angle ($\gamma_2$) should also be counterclockwise to get closer to angle $\alpha$, reaching point v2. The resulting angle ($\gamma_1+\gamma_2$) is larger than angle $\alpha$ therefore in the next iteration, the rotating angle ($\gamma_3$) may rotate clockwise resulting in an angle ($\gamma_1+\gamma_2-\gamma_3$) getting closer to angle $\alpha$. The rotating procedure that brings angle $\Sigma\gamma_1$ closer to $\alpha$, continues a predetermined (T) number of iterations. The difference between the resulting angle ($\Sigma\gamma_i$) and $\alpha$ represents the maximum mistake in this procedure, which is $\frac{1}{2}^T$.

When point (x, y) is represented as a vector $$v = \begin{bmatrix} x \\ y \end{bmatrix},$$

every iteration calculates a rotation, which is performed by multiplying a vector $v_i$ with a rotation matrix $R_L$ representing angle $\gamma_i$ as expressed in equation 1:

$$v_{i+1}=R_i{}^*v_i \qquad \text{Equation 1}$$

The rotation matrix $R_i$ is defined by equation 2:

$$R_i = \begin{bmatrix} \cos(\gamma_i) & -\sin(\gamma_i) \\ \sin(\gamma_i) & \cos(\gamma_i) \end{bmatrix} = \frac{1}{\sqrt{1+\tan^2(\gamma_i)}} * \begin{bmatrix} 1 & -\tan(\gamma_i) \\ \tan(\gamma_i) & 1 \end{bmatrix} \quad \text{Equation 2}$$

Choosing rotating angles $\gamma_i$ such that $\tan(\gamma_1)=+2^{-i}$ may replace the multiplication with a tangent by a division by a power of two as expressed in equation 3 (and as mentioned above, the division by a power of two can be implemented in HW by a shift operation).

$$v_{i+1} = K_i^* \begin{bmatrix} 1 & -\text{sign}_i * 2^{-i} \\ \text{sign}_i * 2^{-i} & 1 \end{bmatrix} * v_i \qquad \text{Equation 3}$$

The value of $K_i$, as expressed by equation 4, may be computed in advance for each i:

$$K_i = \frac{1}{\sqrt{1+2^{-2i}}} \qquad \text{Equation 4}$$

The value of $\text{sign}_i$ in $R_i$ determines the direction of the rotation where +1 is a rotation counterclockwise and −1 is a rotation clockwise.

The resulting equations used to calculate the cosine and sine values using a sequence of iterations of the CORDIC algorithm can be expressed by equations 5 and 6 respectively. The value x is the cosine, and the value y is the sine.

$$x_{i+1}=x_i-(\text{sign}_i)^*y_i^*2^{-i} \qquad \text{Equation 5}$$

$$y_{i+1}=(\text{sign}_i)^*x_i^*2^{-i}+y_i \qquad \text{Equation 6}$$

As described herein above, the CORDIC algorithm includes a set of iterations where, in each step, an angle of a known size is added or deleted to a temporary angle computed in the previous steps, aiming at reaching the size of angle $\alpha$ to which the cosine and sine values (x and y values) are required.

Alternatively (instead of performing the actual computation), all possible results of the CORDIC algorithm iterating T times may be stored in advance in a lookup table (LUT). Each entry i in the LUT provides the sine and cosine values for an angle $\alpha$ after performing i iterations of the CORDIC algorithm. The size of the table storing the result of the CORDIC algorithm after i iterations is $T=2^i$.

It may be appreciated that the number of rotations T determines the accuracy of the result and by increasing the number of rotations the accuracy of the results (sine/cosine values) is increased.

When using a LUT, the number of iterations T determines the size of the table and the number of bits in the index to the table. When performing the actual computation, the number of iterations T determines the computation complexity.

SUMMARY OF THE PRESENT INVENTION

There is provided, in accordance with a preferred embodiment of the present invention, a method for an associative memory device. The method includes providing a look up table (LUT) with all possible solutions for N first iterations of a CORDIC algorithm, receiving a plurality of input angles, concurrently computing a location index for each angle of the plurality of input angles and concurrently storing each index in a column of the associative memory device. The method further includes copying a solution from the LUT in the location index to a plurality of columns associated with the index and concurrently performing M additional iterations of the CORDIC algorithm on the plurality of columns to compute a value of a trigonometric function for each input angle of the plurality of input angles.

Furthermore, in accordance with a preferred embodiment of the present invention, the concurrently computing a location index is performed concurrently on each input angle and includes the following steps: initiating a temporary angle to the value of the input angle, determining a value of a bit and a sign based on a comparison between the temporary angle and zero, assigning the bit to the location index, computing a rotating angle based on the sign and a predetermined angle, adding the rotating angle to the temporary angle. The steps of initiating, determining, assigning and computing are repeated N times and which result in creating a location index with N bits.

Moreover, in accordance with a preferred embodiment of the present invention, N=5 and M=5.

Additionally, in accordance with a preferred embodiment of the present invention, the steps of copying a solution include sequentially going over all entries of the LUT and concurrently copying an X value and a Y value from location index in the LUT to all columns having a same computed location index.

There is provided, in accordance with a preferred embodiment of the present invention, a sine and cosine estimator. The sine and cosine estimator includes a lookup table (LUT) to store sine and cosine values computed in advance for N first iterations of CORDIC algorithm, an associative memory array to store information related to a plurality of angles, a LUT index builder to concurrently build for each of the plurality of angles an index reflecting rotations of predefined rotating angles, a LUT value assigner to assign values from entries in the LUT to columns of the associative memory array sharing a same index, and a CORDIC computer to concurrently compute M additional iterations of CORDIC algorithm on a plurality of columns of the associative memory array thereby providing a sine and cosine value after N+M iterations of CORDIC algorithm to the plurality of angles.

Moreover, in accordance with a preferred embodiment of the present invention, the LUT comprises $2^5$ entries and N=5.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A is a schematic illustration of a point (x, y) in the unit circle;

FIG. 1B is a schematic illustration of the state-of-the-art CORDIC algorithm used iteratively to determine the value of sine or cosine of an angle $\alpha$;

FIG. 6 is a schematic illustration of a flow, implemented in accordance with an embodiment of the present invention, performed by sine/cosine estimator of FIG. 4, to copy the values from the LUT to columns of the associative memory array;

Figure 2:
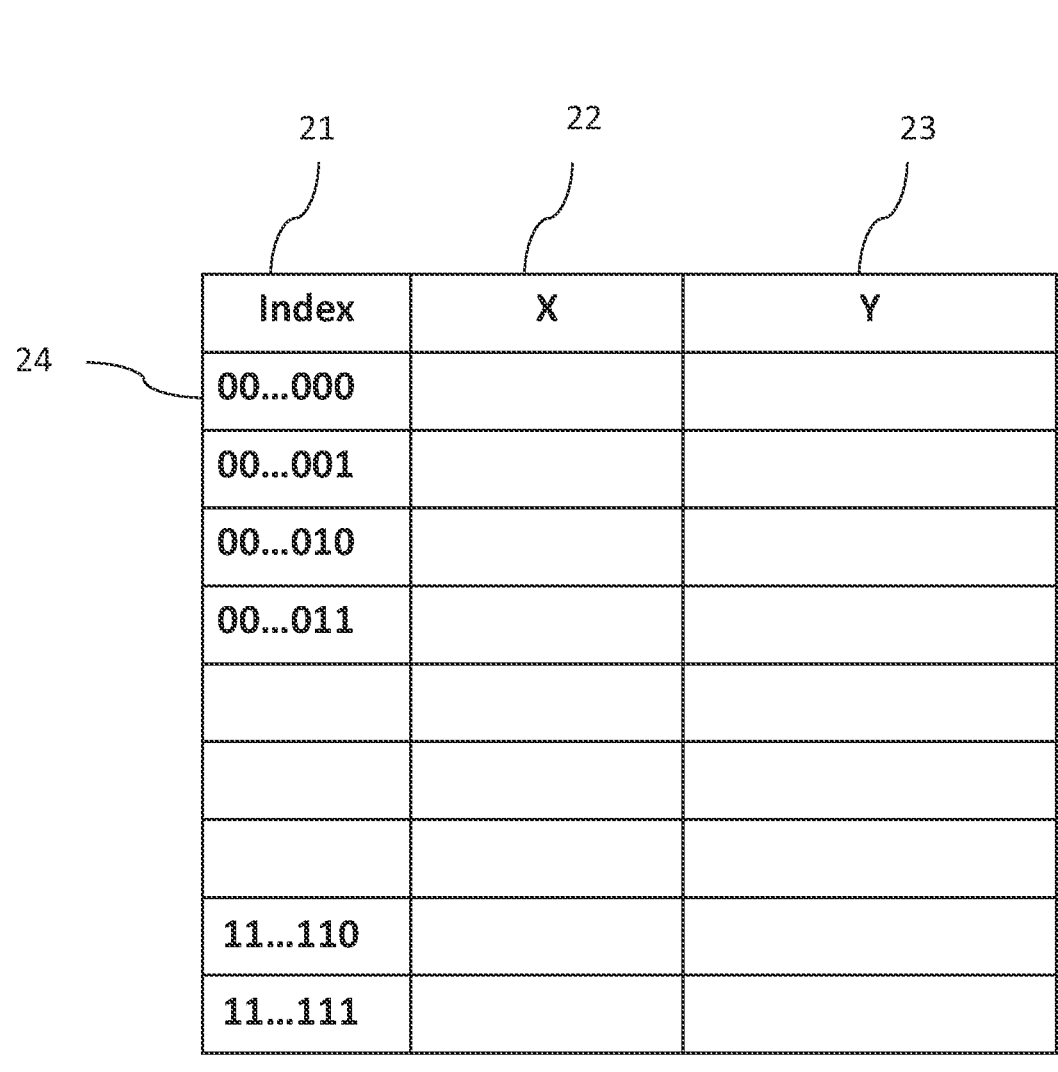
FIG. 2 is an illustration of a look up table (LUT) storing all possible results of the CORDIC algorithm after N iterations.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Numerous applications, such as the Synthetic Aperture Radar (SAR) algorithm used for creating an image from radar pulses, need concurrent efficient computation of trigonometric functions of multiple angles. Applicant has realized that associative memory devices, such as the ones described in U.S. Pat. No. 9,558,812 (entitled "SRAM multi-cell operations") and U.S. Pat. No. 10,832,746 (entitled "Non-volatile in-memory computing device"), commonly owned by Applicant and incorporated herein by reference, may concurrently and efficiently compute sine and cosine values for multiple angles.

Applicant has realized that implementing the CORDIC algorithm in such devices may provide concurrent trigonometrical function computation with constant complexity. The complexity may depend only on the total number of iterations (T) performed by the CORDIC algorithm and not on the number of input angles (which may be very large, e.g., 32K angles) for which the sine or cosine values are needed.

Applicant has also realized that a combined approach, where the result of the first N iterations of the CORDIC algorithm are stored in a LUT and then the computation defined by the CORDIC algorithm is performed for additional M iterations, may improve the performance of the total computation (of T=M+N iterations) compared to using a LUT for the total of T iterations or to performing T iterations of the CORDIC algorithm.

In one embodiment of the combined approach, the LUT may store in advance all possible values that may be obtained after 5 iterations of the CORDIC algorithm and the next 5 iterations of the CORDIC algorithm may be performed concurrently in an associative memory array. The accuracy of the results after 10 iterations of the CORDIC algorithm may be ±0.00097656203.

FIG. 2, to which reference is now made, is an example of a LUT 20 storing all possible results of the CORDIC algorithm after N iterations using N predefined, decreasing sized angles $\gamma_i$ that may be selected such that $\tan(\gamma_i)=\pm2^{-i}$ for each $0<i<N$.

Column 21 of LUT 20 may provide the index to the LUT. The index to the LUT may be built such that each bit i of the index indicates the direction of the rotation of angle $\gamma_i$ in iteration i. The value of LSB of the index indicates the direction of the first rotation, the next bit indicates the direction of the next rotation and so on until the MSB, which indicates the direction of the last rotation. A value 0 for a bit i in the index indicates a counterclockwise rotation by $\gamma_i$ and the value 1 for bit i in the index indicates a clockwise rotation by $\gamma_i$.

Column 22 of LUT 20 may provide the value of X $(\cos(\alpha))$ after 5 iterations of the CORDIC algorithm for each possible index and column 23 may provide the value of Y $(\sin(\alpha))$ after 5 iterations of the CORDIC algorithm for each possible index.

Each row 24 in LUT 20 may provide the sine (Y) and cosine (X) values of an angle $\Sigma\gamma_i$ derived by the consecutive rotations of the predefined angles $\gamma_i$.

Figure 3:
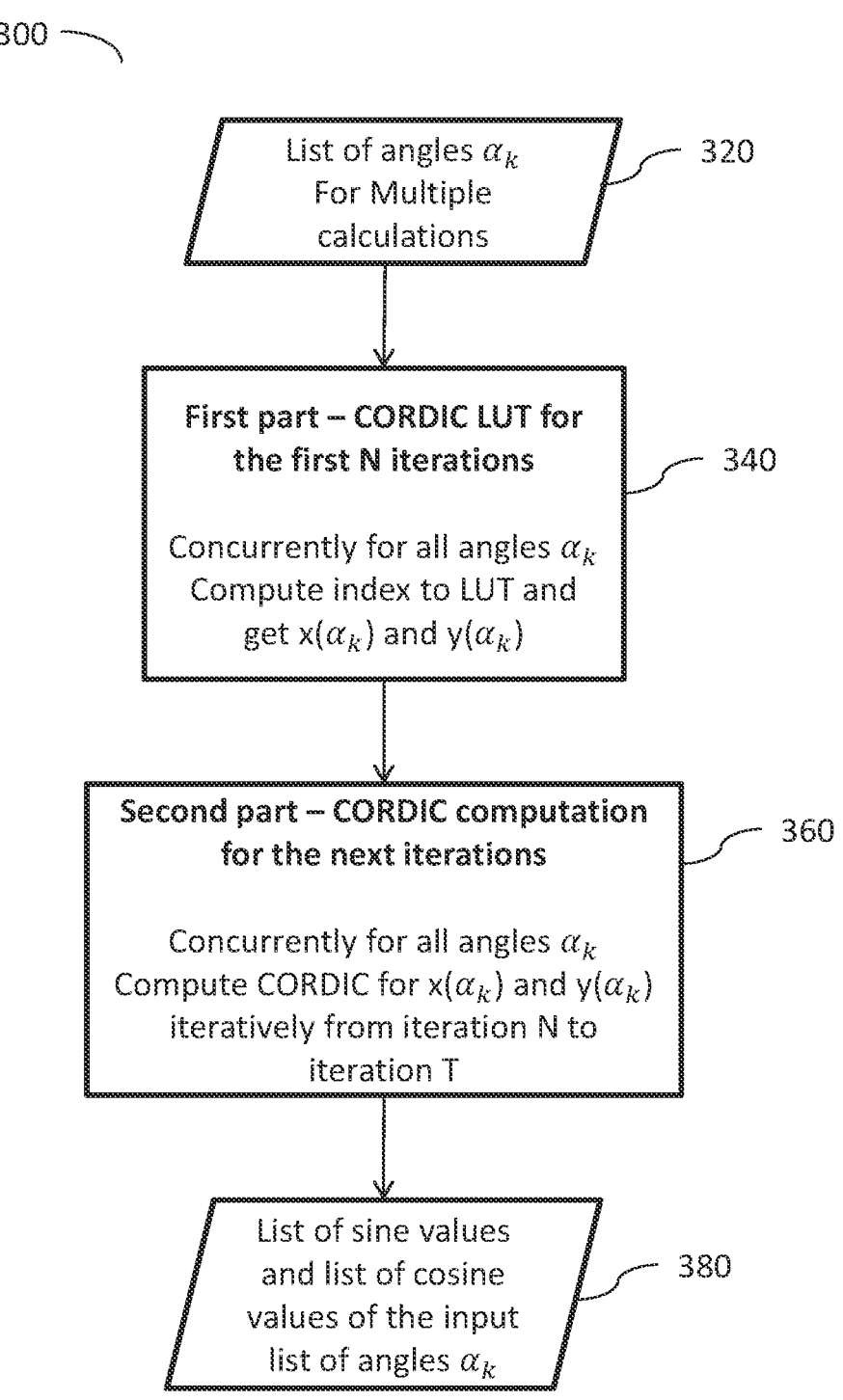
FIG. 3 is a schematic illustration of a flow, operative in accordance with an embodiment of the present invention, describing a combined approach to compute sine and cosine of an angle $\alpha$.

FIG. 3, to which reference is now made, is a schematic illustration of a flow 300, operative in accordance with an embodiment of the present invention, describing the combined approach. In the combined approach, the sine and cosine computation, for multiple angles, may be combined from $2^N$ LUT lookups and parallel computation of the CORDIC algorithm for the next M iterations. The $2^N$ LUT lookups replacing the first N iterations of the CORDIC algorithm for multiple angles $\alpha_k$, and the parallel computation of the next M iterations of the CORDIC algorithm on all angles $\alpha_k$ cover the entire range of T rotations (T=N+M) rotating angles).

In step 320, flow 300 may receive multiple angles $\alpha_k$ for which the cosine and or sine values are needed.

In step 340, flow 300 may perform the first part of the combined approach using a LUT. In step 340, flow 300 may concurrently, for each angle $\alpha_k$, compute the index to the LUT and may read from the LUT the values $X_k$ and $Y_k$ for each angle $\alpha_k$ computed in advance for the first N iterations of the CORDIC algorithm.

In step 360, flow 300 may perform the second part of the combined approach and may perform M additional iterations of the CORDIC computation. In step 360, flow 300 may concurrently, for each angle $\alpha_k$, compute the next M iterations of the CORDIC algorithm starting with the values $X_k$ and $Y_k$ provided by step 340 and generating the final values of $X_k$ and $Y_k$ after the total of T iterations.

In step 380, flow 300 may provide the final values $X_k$ and $Y_k$ that are the estimated value of cosine and sine trigonometric functions after T=N+M iterations.

Figure 4:
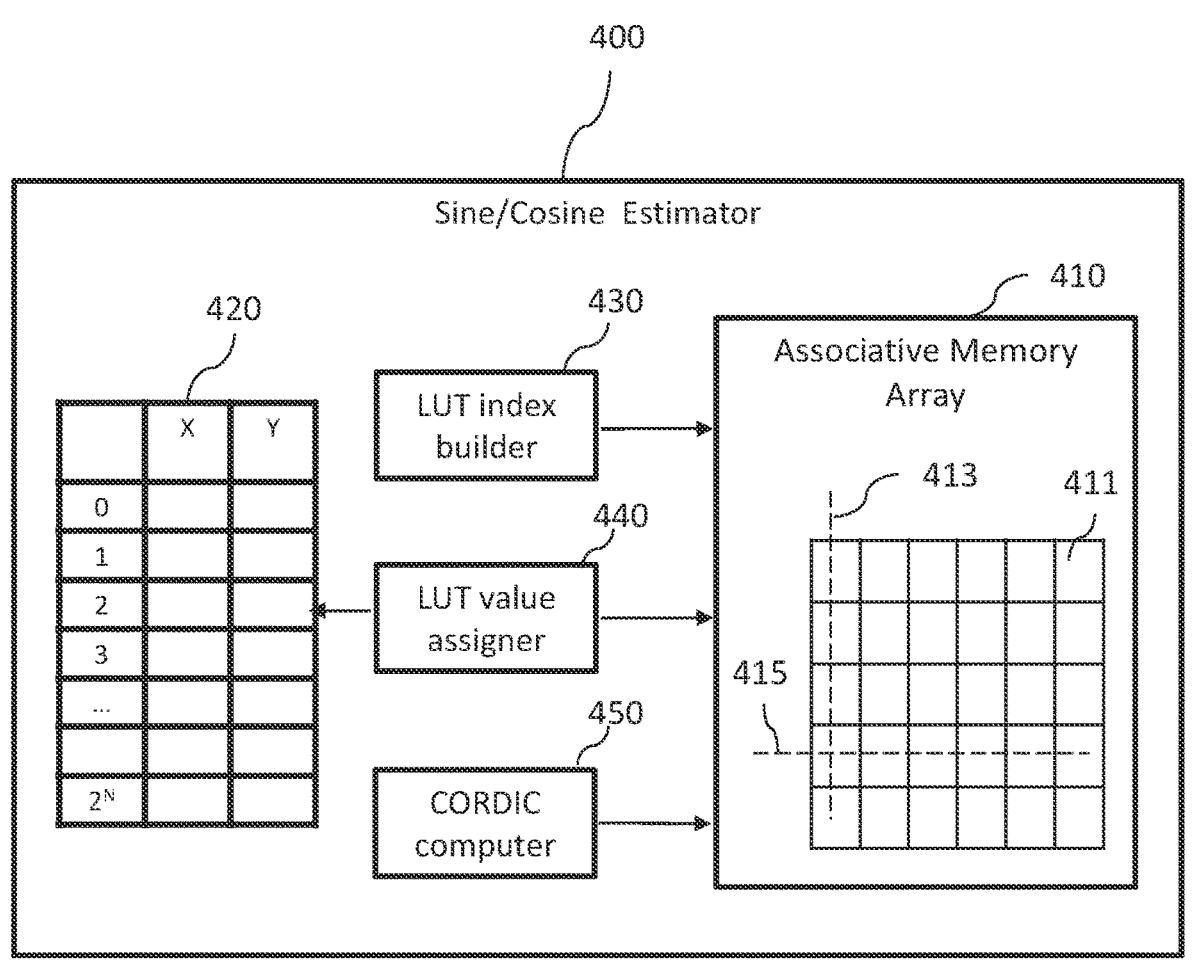
FIG. 4 is a schematic illustration of a sine/cosine estimator, constructed and operative in accordance with an embodiment of the present invention.

FIG. 4, to which reference is now made, is a schematic illustration of a sine/cosine estimator 400, constructed and operative in accordance with an embodiment of the present invention. Sine/cosine estimator 400 may use the combined approach and may implement flow 300 of FIG. 3. Sine/cosine estimator 400 comprises an associative memory array

410, a LUT 420; a LUT index builder 430; a LUT value assigner 440 and a CORDIC computer 450.

Associative memory array 410 may comprise a plurality of cells 411 arranged in a matrix having bit lines 413 (columns) and word lines 415 (rows). All cells 411 in the same column may be connected to the same bit line 413 and all cells 411 in the same row may be connected to the same word line 415. Associative memory array 410 is detailed in FIG. 8 herein below. All intermediate computation results related to an angle $\alpha_k$ may be stored in column k of associative memory array 410.

LUT 420 may be an embodiment of LUT 20 (FIG. 2) storing the results of the CORDIC algorithm after N (e.g., 5) rotations. In this embodiment, the number of bits in an index to LUT 420 may be 5 and the size of LUT 420 may be $2^5=32$. It may be appreciated that the size of LUT 420 (32 entries) in embodiments of the present invention may be optimized to current capabilities of the hardware used to build sine/cosine estimator 400. The size of LUT 420 is not limited to the size indicated above and may change as hardware capabilities improves to achieve the best performance.

LUT index builder 430, constructed and operative in accordance with an embodiment of the present invention, may concurrently, for each angle $\alpha_k$, create an index $J_k$ to be used as an index to LUT 420. LUT index builder 430 may write the created index $J_k$ to those bit lines 413 related to angle $\alpha_k$. of associative memory array 410. The flow for creating an index $J_k$ for each angle $\alpha_k$ is described in FIG. 5 herein below.

LUT value assigner 440, constructed and operative in accordance with an embodiment of the present invention, may go through all entries in LUT 420 and may concurrently write the values $X_k$ and $Y_k$ for each index $J_k$ to those columns of associative memory array 410 associated with index $J_k$. The flow performed by LUT value assigner 440 is described in FIG. 6 herein below.

CORDIC computer 450, constructed and operative in accordance with an embodiment of the present invention, may concurrently, for each angle $\alpha_k$, compute M iterations of the CORDIC algorithm, starting with values $X_k$ and $Y_k$ stored in columns of associative memory array 410. The flow performed by CORDIC computer 450 is described in FIG. 7 herein below.

Figure 5:
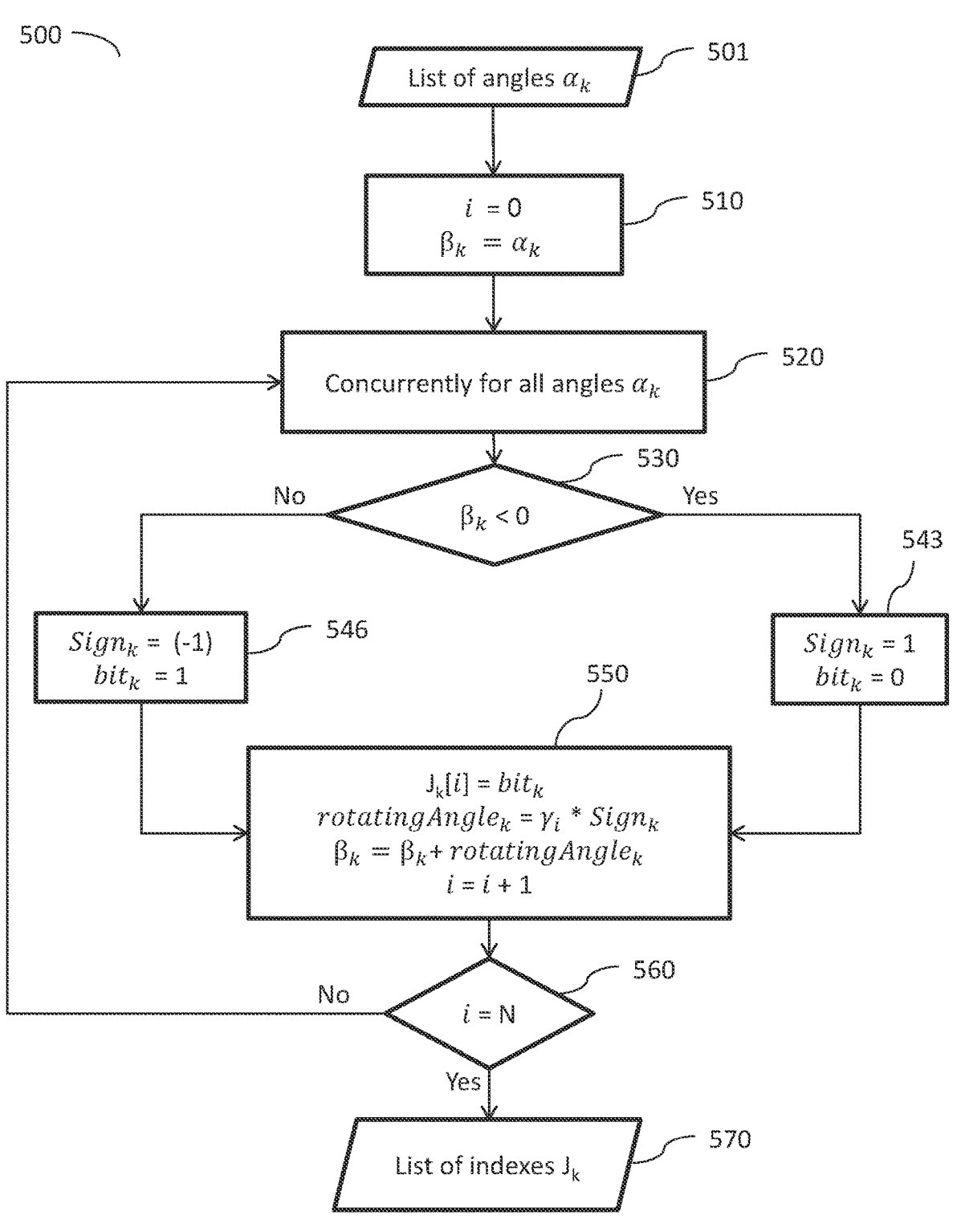
FIG. 5 is a schematic illustration of a flow, implemented in accordance with an embodiment of the present invention, performed by sine/cosine estimator of FIG. 4, to create for each input angle an index to the LUT.

FIG. 5, to which reference is now made, is a schematic illustration of flow 500, for computing an index for each angle $\alpha_k$, implemented in accordance with an embodiment of the present invention and performed by LUT index builder 430. The index to LUT 420 for each input angle $\alpha_k$ may be computed iteratively for each bit in the index.

In step 501, LUT index builder 430 may receive a plurality of angles $\alpha_k$ for which the sine or cosine values are required.

In step 510, LUT index builder 430 may initialize each $\beta_k$ to the value of an input angle $\alpha_k$ and the iterator i (used to iterate over bits of the index) to 0.

In step 520, LUT index builder 430 may start the first iteration concurrently on all angles $\beta_k$. In steps 530, 543, 546, 550 and 560, LUT index builder 430 may perform the rotations and may determine the value of the bits in the plurality of indexes $J_k$ (the index related to each angle $\alpha_k$) to LUT 420. LUT index builder 430 may perform N rotations to compute N bits for each index $J_k$. At each iteration i, bit i of index $J_k$ may be determined by comparing the value of a temporary angle $\beta_k$ to zero and assigning the relevant value (0 or 1) to bit i of $J_k$.

In step 530, LUT index builder 430 may compare the value of each angle $\beta_k$ 0. If angle $\beta_k$ is smaller than 0, LUT index builder 430 may continue to step 546 where $\text{Sign}_k$ may be assigned the value (−1) and a value of a bit i of each index $J_k$ may be assigned the value 1. If angle $\beta_k$ is larger than 0, LUT index builder 430 may continue to step 543 where $\text{Sign}_k$ may be assigned the value 1 and a value of a bit i of each index $J_k$ may be assigned the value 0. In step 550, LUT index builder 430 may update the value of bit i of each index $J_k$, compute the current rotating rotatingAngle$_k$ (by multiplying $\gamma_i$ by $\text{Sign}_k$), that may be added to temporary angle $\beta_k$. LUT index builder 430 may then increment iterator i to handle the next bit of each index $J_k$.

In step 560, LUT index builder 430 may check if all bits of indexes $J_k$ have been computed. If the index is not ready, LUT index builder 430 may return to step 520, and if the index is completed, LUT index builder 430 may provide (step 570) as output an index $J_k$ for each input angle $\alpha_k$ and write the computed indexes $J_k$ to columns of associative memory array 410.

FIG. 6, to which reference is now made, is a schematic illustration of flow 600, implemented in accordance with an embodiment of the present invention and performed by LUT value assigner 440.

In step 601, LUT value assigner 440 may receive a plurality of angles $\alpha_k$ with an index $J_k$ associated to each angle $\alpha_k$.

In step 610, LUT value assigner 440 may initialize iterator i (used to iterate over the entries of LUT 420, each entry identified by an index) to 0. In step 620, LUT value assigner 440 may start the first iteration concurrently on all columns of associative memory array 410. In step 630 the value of each index $J_k$ may be compared to i. If the value of $J_k$ equals i, LUT value assigner 440 may continue to step 640 and copy the value of X from entry i in LUT 420 to a column associated with angles $\alpha_k$ and continue to step 650. If the value of $J_k$ is not equal to i LUT value assigner 440 may continue directly to step 650. In step 650 the iterator i may be incremented and in step 660 LUT value assigner 440 may check if flow 600 reached the last entry of LUT 420. If the entry i is not the last entry, LUT value assigner 440 may return to step 620 to handle the next entry of LUT 420. Otherwise, LUT value assigner 440 may finish (step 670) having the values of $X_k$ and $Y_k$ associated with each angle $\alpha_k$ written to columns of memory array 410.

Figure 7:
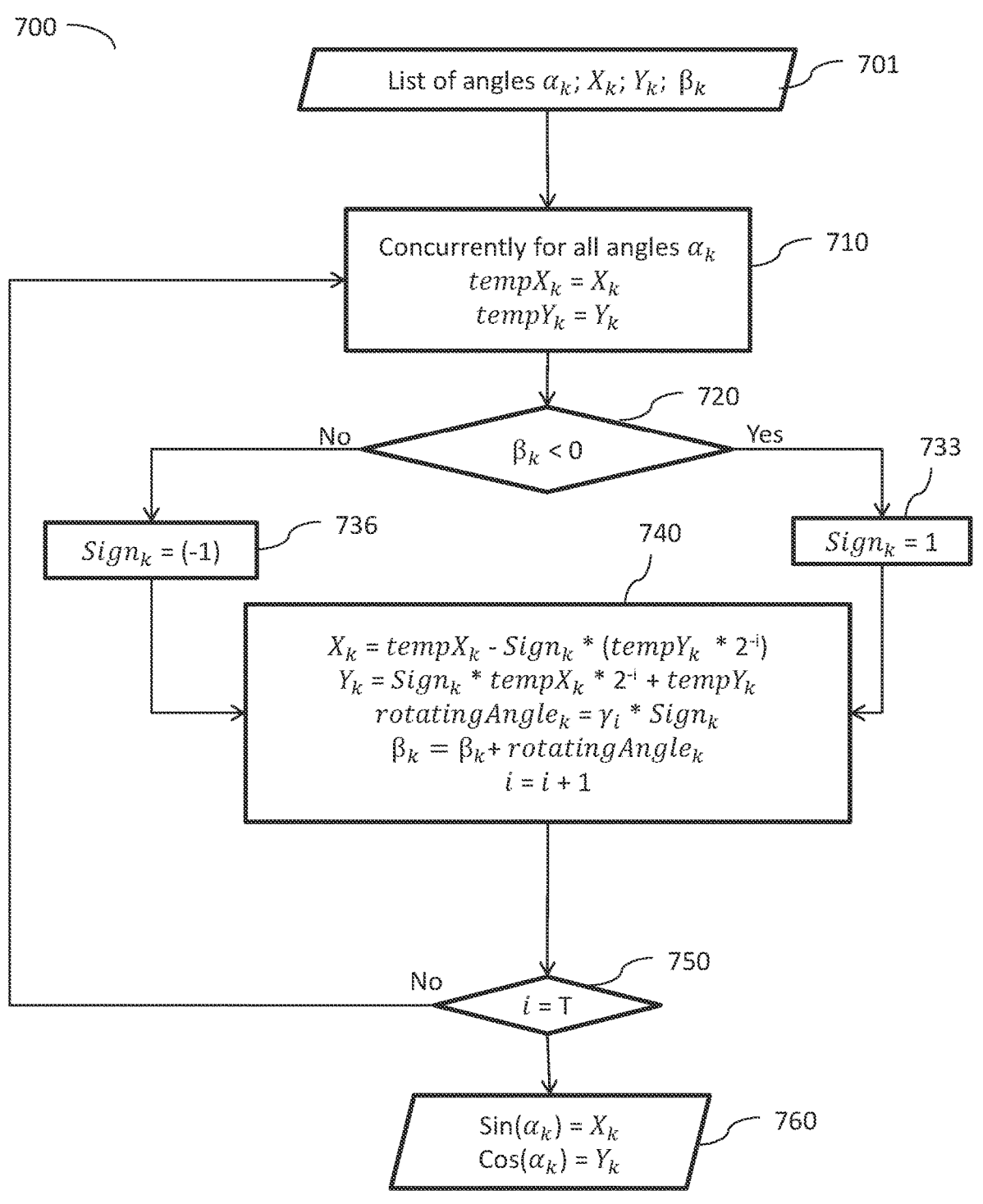
FIG. 7 is a schematic illustration of flow, implemented in accordance with an embodiment of the present invention, performed by sine/cosine estimator of FIG. 4, to compute additional iterations of the CORDIC algorithm.

FIG. 7, to which reference is now made, is a schematic illustration of flow 700, implemented in accordance with an embodiment of the present invention and performed by CORDIC computer 450.

The input to CORDIC computer 450, in step 701, may be all input angles $\alpha_k$, the values of $X_k$ and $Y_k$ and the value of temporary angle $\beta_k$ computed by LUT index builder 430 all stored in columns of memory array 410. The next M iterations of the CORDIC algorithm may also be concurrently executed on all columns of associative memory array 410 providing the final step of the computation of sine/cosine estimator 400 which is the sine and cosine values for all input angles $\alpha_k$.

In step 710, CORDIC computer 450 may create for each angle $\alpha_k$ temporary parameters tempX$_k$ and tempY$_k$ and may initialize them to $X_k$ and $Y_k$ respectively. The temporary parameters may be used throughout the computation of the CORDIC algorithm as input for the next iteration.

In step 720, the value of each angle $\beta_k$ may be compared to 0. If angle $\beta_k$ is smaller than 0, flow 700 may continue to step 736 where the value of $\text{Sign}_k$ may be set to (−1). If angle $\beta_k$ is larger than 0, flow 700 may continue to step 733 where the value of $\text{Sign}_k\alpha_k$ may be set to (+1).

In step 740, CORDIC computer 450 may concurrently, for all angles $\alpha_k$, compute the next iteration of the CORDIC algorithm and may update the values of $X_k$ and $Y_k$ for all of the current iteration i using the temporary parameters as defined in equations 7 and 8:

$$X_k = \text{temp}X_k - \text{Sign}_k*(\text{temp}Y_k*2^i) \qquad \text{Equation 7}$$

$$Y_k = \text{Sign}_k*\text{temp}X_k*2^{-i} + \text{temp}Y_k \qquad \text{Equation 8}$$

The current rotating angle $\gamma_i$ may be added to or deleted from temporary angle $\beta_k$ according to the $\text{Sign}_k$ and iterator i (used to iterate over predefined angles $\gamma_i$) may be incremented.

In step 750, CORDIC computer 450 may check if the final iteration has been completed. If the iteration is not the last (i.e., iteration i is smaller than T), CORDIC computer 450 may return to step 710, and if the last iteration has be performed, as checked in step 750, CORDIC computer 450 may continue to step 760 where the computed values of each $\alpha_k$—$X_k$ and $Y_k$—may provide the values of $\cos(\alpha_k)$ and $\sin(\alpha_k)$, respectively.

It may be appreciated that the number of iterations performed by CORDIC computer 450 (e.g., M=5) may be optimized to current capabilities of the hardware of sine/cosine estimator 400 but is not limiting and may change to achieve the best performance according to hardware capabilities in the future.

Figure 8:
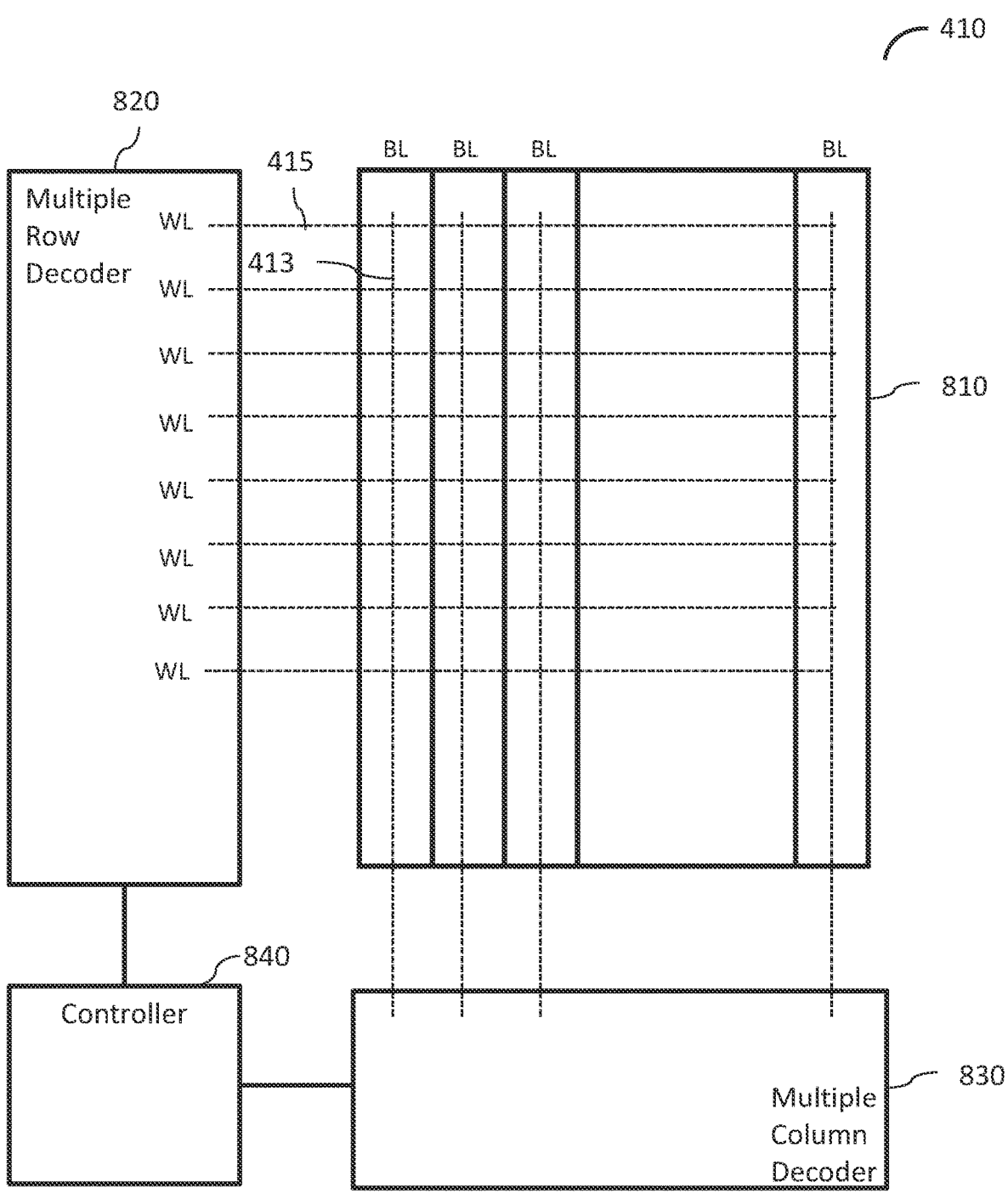
FIG. 8 is a schematic illustration of an associative memory array, constructed and operative in accordance with an embodiment of the present invention, used by sine/cosine estimator of FIG. 4.

FIG. 8, to which reference is now made, illustrates associative memory array 410 used by sine/cosine estimator 400. Associative memory array 410 comprises a memory array 810, a multiple row decoder 820, a multiple column decoder 830 and a controller 840.

Memory array 810 may be any suitable memory array, volatile or non-volatile, destructive, or non-destructive and may comprise pure memory cells arranged in rows and columns. The cells in a column may be connected by a bit line processor capable of performing computation on the column. The cells in a row may be connected by a word line capable of activating cells in multiple columns. Data including input, intermediate results and output may be stored in columns of memory array 810.

Multiple row decoder 820 may be any suitable row decoder capable of concurrently activating a plurality of rows. Multiple row decoder 820 may activate two or more rows of memory array 810 at a time. When multiple rows are activated, all columns of memory array 810 may provide concurrent computation for the activated rows when a read operation is performed and may provide a concurrent write operation when a write operation is performed.

Multiple column decoder 830 may comprise any suitable column decoder capable of concurrently activating a plurality of columns and any suitable sensing circuitry that may be capable of sensing the value on any bit-line connecting cells of a column. Multiple column decoder 830 may provide the result of a Boolean function performed between multiple cells of each column, concurrently activated by multiple row decoder 820. Multiple column decoder 830 may select which sensed columns to write back to memory array 810 and may be capable of writing the value from a plurality of sensing circuitry components concurrently.

Controller 840 may control the activating of multiple row decoder 820 and multiple column decoder 830. Controller 840 may indicate to multiple row decoder 820 which rows to activate for the current operation, read or write, and may also indicate to multiple column decoder 830 from which columns to write the output back into memory array 810 and the rows to which the data may be written in a selective write operation.

Controller 840 may comprise various parts of sine/cosine estimator 400, such as LUT index builder 430, LUT value assigner 440 and CORDIC computer 450.

It may be appreciated that the computations of sine/cosine estimator 400 may occur within the associative memory array, as a result of multi read and multi write operations. Thus, sine/cosine estimator 400 may implement concurrently any Boolean operation, on all the columns of memory associative memory array 410, resulting in a massive, in place, parallel computation. (Each column may perform the needed computation for a single angle and activating multiple columns may result in concurrent computation of the trigonometric function for multiple angles).

It may be appreciated that the complexity of the computation of sine/cosine estimator 400 does not depend on the number of input angles $\alpha_k$.

Sine/cosine estimator 400 may receive multiple angles as input and may handle the computation of each angle $\alpha_k$ in one or more dedicated columns of associative memory array 410. The complexity of computing sine and cosine of a single angle is the same as the complexity of computing sine and cosine of multiple angles.

The LUT index builder 430 may concurrently, for each angle $\alpha_k$, compute an index $J_k$. The complexity of this operation may be O(N) where N is the number of bits of the LUT index.

For each entry in the LUT 420, LUT value assigner 440 may concurrently copy the values of X and Y from entry $J_k$ of LUT 420 to columns of associative memory array 410 sharing the same index $J_k$. The complexity of this operation is $O(2^N)$ where N is the number of bits of the LUT index.

Concurrently, for each angle, CORDIC computer 450 may compute the value of X and Y starting from iteration N (the value for the first N iterations is taken from the LUT) for M additional iterations. The complexity of this operation is O(M) where M is the number of iterations of computing the CORDIC algorithm.

It may also be noted that sin/cosine estimator 400 may modify the representation of input angles $\alpha_k$ to a normalized sign fixed point with 14 bits after the dot in radians. The normalization may comprise dividing each angle $\alpha_k$ (which may be in the range $[-\pi, \pi]$) by $\pi$ which may result in a new range $[-1, 1]$.

The standard CORDIC operates with angles in the range of $[-\pi/2, \pi/2]$ while sin/cosine estimator 400 may operate on the entire range $[-\pi, \pi]$ of angles which may be normalized. Sin/cosine estimator 400 may transform the results to align them back to the original values before the normalization and may normalize them again (divide by 2).

It may be appreciated that, for 10 iterations, the smallest rotating angle is arctan ($\frac{1}{1024}$) radians which is approximately 0.000976562 radians; therefore, the maximum error of sin/cosine estimator 400 may be approximately 0.00097656203. (The maximum error is estimated by converting the max error in radians to a pure number (number without units). The smallest rotation angle when T=10 is $\frac{1}{1024}$ therefore the maximum error for cosine is $4.768*10^{\wedge}-7$ and for sine is 0.00097656203.)

It may be appreciated that the computation time of each method separately in associative memory array 410 (LUT with 10-bit index or 10 iterations of the CORDIC algorithm) is higher than the computation time of the combined approach as described herein below.

For 10 iterations of the CORDIC algorithm: each iteration takes (68+2*i) when i is the iteration number with a total of 770 cycles.

For a LUT covering 10 iteration (size of the LUT $2^{10}$): each iteration for computing the indexes $J_k$ takes 24 cycles per iteration with a total of 240 cycles.

The complexity of the lookup for getting the values from LUT 420 to associative memory array 410 is 1024 iterations with 5 cycles per iterations, which sum up to 5 k cycles.

The complexity of 10 iterations of the combined approach, 5 iterations covered by each part, (LUT of size $2^5$ and 5 iterations of the CORDIC algorithm) includes step 340 (FIG. 3) of flow 300 using CORDIC LUT for the first 5 iterations and step 360 of flow 300 CORDIC computation for the next 5 iterations.

Step 340 (LUT) includes 5 iterations that takes 24 cycles each to build index $J_k$ with a total of 5*24=120 cycles, and 32 lookups that takes 5 cycles each to assign the values from the LUT to each angle with a total of 5*32=180 which sum up to 120+160=280 for the entire LUT operation.

The CORDIC part includes 5 iterations that takes 68+2*i cycles each which sum up to less than 400 cycles.

The total number of cycles for the combined approach is therefore 280+400=680 cycles, which is less than using LUT for 10 iterations (3000) or performing 10 iterations of the CORDIC algorithm (770).

It may be appreciated that the steps shown for the flows herein above are not intended to be limiting and that each flow may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for an associative memory device, the method comprising:
   providing a look up table (LUT) with all possible solutions for N first iterations of a CORDIC algorithm;
   receiving a plurality of input angles;
   concurrently computing a location index for each input angle of said plurality of input angles and concurrently storing each index in a column of said associative memory device;
   copying a solution from said LUT in said location index to a plurality of columns associated with said index; and
   concurrently performing M additional iterations of the CORDIC algorithm on said plurality of columns to compute a value of a trigonometric function for each said input angle of said plurality of input angles.

2. The method of claim 1 wherein said concurrently computing a location index comprises:
   concurrently for each said input angle:
   initiating a temporary angle to the value of said input angle;
   determining a value of a bit and a sign based on a comparison between said temporary angle and zero;
   assigning said bit to said location index;
   computing a rotating angle based on said sign and a predetermined angle;
   adding said rotating angle to said temporary angle;
   repeating the steps of initiating, determining, assigning and computing N times thereby creating said location index with N bits.

3. The method of claim 1 wherein N=5 and M=5.

4. The method of claim 1 wherein said copying a solution comprises:

sequentially going over all entries of said LUT and concurrently copying an X value and a Y value from a location index in said LUT to all columns having a same computed location index.

5. A sine and cosine estimator comprising:

a lookup table (LUT) to store sine and cosine values computed in advance for N first iterations of a CORDIC algorithm;

an associative memory array to store information related to a plurality of angles;

a LUT index builder to concurrently build for each of said plurality of angles an index reflecting rotations of predefined rotating angles;

a LUT value assigner to assign values from entries in said LUT to columns of said associative memory array sharing a same index; and a CORDIC computer to concurrently compute M additional iterations of said CORDIC algorithm on a plurality of columns of said associative memory array thereby providing a sine and cosine value after N+M iterations of said CORDIC algorithm to said plurality of angles.

6. The sine and cosine estimator of claim 5 wherein N=5 and said LUT comprises $2^5$ entries.

\* \* \* \* \*